United States Patent
Beeson

(10) Patent No.: US 9,466,057 B2
(45) Date of Patent: Oct. 11, 2016

(54) RF PRESENTATION INSTRUMENT WITH SENSOR CONTROL

(75) Inventor: Curt Beeson, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1631 days.

(21) Appl. No.: 11/381,630

(22) Filed: May 4, 2006

(65) Prior Publication Data

US 2007/0267504 A1    Nov. 22, 2007

(51) Int. Cl.
| | |
|---|---|
| G06F 21/00 | (2013.01) |
| G06Q 20/32 | (2012.01) |
| G06Q 20/36 | (2012.01) |
| G06Q 20/38 | (2012.01) |
| H04M 1/725 | (2006.01) |

(52) U.S. Cl.
CPC ............ *G06Q 20/327* (2013.01); *G06Q 20/32* (2013.01); *G06Q 20/3674* (2013.01); *G06Q 20/382* (2013.01); *H04M 1/7253* (2013.01)

(58) Field of Classification Search
CPC .. G06Q 20/327; G06Q 20/32; G06Q 20/382; G06Q 20/3674; H04M 1/7253
USPC ............ 340/5.82, 854.6, 545.3, 567, 815.71; 709/217; 235/379; 705/64
See application file for complete search history.

(56) References Cited

U.S. PATENT DOCUMENTS

| | | | |
|---|---|---|---|
| 5,585,787 A | 12/1996 | Wallerstein | |
| 5,913,203 A | 6/1999 | Wong et al. | |
| 5,937,394 A | 8/1999 | Wong et al. | |
| 5,955,961 A | 9/1999 | Wallerstein | |
| 5,956,699 A | 9/1999 | Wong et al. | |
| 6,161,762 A | 12/2000 | Bashan et al. | |
| 6,356,196 B1 | 3/2002 | Wong et al. | |

(Continued)

FOREIGN PATENT DOCUMENTS

| | | |
|---|---|---|
| CN | 1377199 A | 10/2002 |
| CN | 1606249 A | 4/2005 |

(Continued)

OTHER PUBLICATIONS

International Search Report and Written Opinion of the International Search Authority dated Nov. 9, 2007 corresponding to PCT International Application No. PCT/US07/68057, filed May 2, 2007.

(Continued)

*Primary Examiner* — John Hayes
*Assistant Examiner* — John M Winter
(74) *Attorney, Agent, or Firm* — Kilpatrick Townsend & Stockton LLP

(57) ABSTRACT

A presentation instrument is described which includes an input sensor, a memory unit, and an antenna configured to wirelessly transmit and receive data. The antenna is configured to receive a request for data stored on the memory unit, and may also be configured to induce a voltage from a magnetic field to power the presentation instrument. The input sensor may control whether the presentation instrument can be so powered from the magnetic field. Alternatively, input from the input sensor may otherwise control the functionality of the presentation instrument. By way of example, an input received by the input sensor may be transmitted in addition to the requested data. Additionally, a system is described to process the requested data and additional input data, in accordance with a rules data store.

13 Claims, 10 Drawing Sheets

(56) References Cited

U.S. PATENT DOCUMENTS

| | | |
|---|---|---|
| 6,592,044 B1 | 7/2003 | Wong et al. |
| 6,604,685 B1* | 8/2003 | Norton .......................... 235/492 |
| 6,607,127 B2 | 8/2003 | Wong |
| 6,609,654 B1 | 8/2003 | Anderson et al. |
| 6,753,341 B1 | 6/2004 | King |
| 6,805,288 B2 | 10/2004 | Routhenstein et al. |
| 6,811,082 B2 | 11/2004 | Wong |
| 7,097,108 B2 | 8/2006 | Zellner et al. |
| 2002/0096570 A1 | 7/2002 | Wong et al. |
| 2003/0061168 A1 | 3/2003 | Routhenstein |
| 2004/0110528 A1 | 6/2004 | Aoyama et al. |
| 2004/0127256 A1 | 7/2004 | Goldthwaite et al. |
| 2004/0267545 A1 | 12/2004 | Buchmann et al. |
| 2005/0001712 A1* | 1/2005 | Yarbrough .................... 340/5.82 |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0091338 A1* | 4/2005 | de la Huerga ................ 709/217 |
| 2005/0116050 A1* | 6/2005 | Jei et al. ........................ 235/492 |
| 2005/0137986 A1 | 6/2005 | Kean et al. |
| 2005/0162338 A1 | 7/2005 | Ikeda et al. |
| 2005/0211760 A1* | 9/2005 | Dewan et al. ................ 235/375 |
| 2006/0157563 A1* | 7/2006 | Marshall ....................... 235/382 |
| 2007/0037566 A1* | 2/2007 | D'Agostino et al. ......... 455/421 |
| 2007/0100748 A1 | 5/2007 | Dheer et al. |
| 2007/0204027 A1 | 8/2007 | Shih et al. |
| 2007/0220272 A1* | 9/2007 | Campisi et al. .............. 713/186 |
| 2007/0255620 A1 | 11/2007 | Tumminaro et al. |
| 2007/0279285 A1 | 12/2007 | Hilgers |
| 2008/0006685 A1 | 1/2008 | Rackley, III et al. |
| 2008/0010215 A1 | 1/2008 | Rackley, III et al. |
| 2008/0130849 A1 | 6/2008 | Mock et al. |
| 2009/0070833 A1 | 3/2009 | Rolf |
| 2010/0087241 A1 | 4/2010 | Nguyen et al. |

FOREIGN PATENT DOCUMENTS

| | | |
|---|---|---|
| JP | 2001-297198 | 10/2001 |
| JP | 11-85924 | 3/2011 |
| WO | WO 98/14900 | 4/1998 |
| WO | WO 01/88659 A2 | 11/2001 |

OTHER PUBLICATIONS

Australian Patent Application No. 2007248070, Examination Report dated May 11, 2010, 2 pages.

U.S. Appl. No. 11/695,968, Office Action dated Jan. 19, 2010, 11 pages.

* cited by examiner

RF PRESENTATION INSTRUMENT WITH SENSOR CONTROL

FIELD OF THE INVENTION

The present invention relates to wireless communications in general and, in particular, to a presentation instrument with wireless functionality.

BACKGROUND OF THE INVENTION

As the size and cost of integrated circuits have continued to progress downward, microprocessors have been incorporated into an ever increasing range of devices. Specifically, one market segment which has seen significant growth is the area of smart cards. One of the first applications for smart cards was debit cards, making it possible to implement more secure payment systems.

Like integrated circuits, the form factor and cost of wireless components have seen a similar downward progression. With advancements in technology and manufacturing, contactless smart cards have begun to proliferate. Often, these contactless smart cards are passive, with no internal power supply, and thus are powered wirelessly via a magnetic field or through other means. Alternatively, a small battery may be embedded as a power supply.

One of the primary growth areas for contactless smart card applications is presentation instruments, such as credit or debit cards. When such presentation instruments are activated (perhaps by a magnetic field produced by a scanner or other point-of-sale device), a user's account information stored thereon may be transmitted via radio signal. Because of this wireless activation and transmission, in many instances there may be an increased risk of theft or other abuse. Components are available which can be configured to snoop or otherwise collect the account information contained in the signals.

Typically, such radio signals transmitted from smart cards are encrypted. However, increasingly sophisticated technology is being developed to evade this protection. Hence, for these and other reasons, there is a need for alternative methods that provide for improved security for wireless presentation instruments.

BRIEF SUMMARY OF THE INVENTION

Various embodiments of the invention comprise presentation instruments which include input sensors. The presentation instrument may, for example, be a credit card, a debit card, an ATM card, a stored value card, a gift card, or other form of smart card. In one embodiment, the presentation instrument includes a memory unit, an input sensor and an antenna configured to wirelessly transmit and receive data. The antenna is configured to receive a request for data stored on the memory unit, and transmit a wireless signal responsive to the request. The presentation instrument also includes a processing unit configured to access the memory unit to retrieve the requested data, and add data representative of the received input from the input sensor to the requested data, for transmission via the wireless signal.

In one embodiment, the memory unit further includes a secure storage region, with the processing unit configured to control access to the secure storage region based on an input received at the input sensor. The processing unit may be configured to prevent access to the secure storage region absent a substantially concurrent input received at the input sensor. The antenna may be configured to draw power from an external source to induce voltage for the presentation instrument, and the presentation instrument may be unable to be so powered absent certain input received at the input sensor.

The input sensor, in some embodiments, is limited to a first state and a second state. In one particular embodiment, the first state occurs when there is no input at the input sensor, and the second state occurs with any received input. In other embodiments, the input sensor comprises a number of input sensors, and different combinations of input result in different resulting states. The input sensor may include a dual contact point switch, a capacitance switch, a light sensor, a multi-position slide switch, and any combination thereof. The input may be a biometric input, a password input, or any other form of input known in the art.

In one embodiment of the invention, the presentation instrument comprises an input means, a data storage means, and means for wirelessly transmitting and receiving data. The presentation instrument transmits a signal including data from the storage means and data representative of the received input. The presentation instrument may further include a processing means configured to control access to a secure storage region of the data storage means. In one embodiment, this presentation instrument wirelessly draws power from an external source to induce a voltage for the presentation instrument. The presentation instrument may be configured to be prevented from being powered from the external source without certain input received at the input means.

In another embodiment of the invention, a presentation instrument includes an input sensor for controlling access to a memory unit. An antenna is coupled with the memory unit and input sensor, and configured to wirelessly transmit and receive signals. A request for data stored on the memory unit is received, and the input received at the input sensor determines whether the requested data stored on the memory unit is transmitted.

In one embodiment, a processing unit may be configured to receive the input from the input sensor and control, based on the received input, whether the requested data stored on the memory unit is accessed or transmitted. In another embodiment, the antenna comprises an inductively coupled transponder configured to induce a voltage from a magnetic field to power the presentation instrument. In this embodiment, a received input modifies the configuration of the presentation instrument to control whether the presentation instrument may be powered from the magnetic field. The received input may modify the configuration for a period of time after it is received, to allow the presentation instrument to be powered from the magnetic field for the period of time.

In one embodiment, a processing unit is configured to allow access to an unsecured storage region regardless of the received input. In some embodiments, the input sensor is limited to a first state and a second state. In one such embodiment, the first state occurs when there is no input, and the second state occurs with any received input. In other embodiments, the input sensor comprises of a number of input sensors, and different combinations of input result in different resulting states.

Another embodiment comprises a presentation instrument that includes an input means for controlling transmission. The presentation instrument comprises means for wirelessly drawing power from an external source to produce a voltage for the presentation instrument, and an input means controlling whether the presentation instrument is able to wirelessly draw power from the external source to produce a voltage for the presentation instrument. Further, there are means for wirelessly transmitting and receiving data, and means for processing received data.

Yet another embodiment of the invention comprises a system for processing data received from a presentation instrument with an input sensor. The system includes a host computer system with a processor and a data store. The data store includes rules for processing the data received from the memory unit of the presentation instrument, wherein the rules identify one or more of a plurality of different outputs based at least in part on the data representative of the input received via the input sensor. The host computer system is configured to receive a set of data with an input from the presentation instrument, and process the set of data by applying the set of data to the rules from the data store.

In one embodiment, the set of data further includes a request for a transaction authorization for an account associated with the presentation instrument. The host computer system may authorize or deny the transaction, or may produce an output directing reuse of the presentation instrument with a valid user input. The transaction may be defined by a location, merchant, time, amount, stock keeping unit (SKU) number, or any combination thereof, and the rules may identify an output of the plurality of outputs based at least in part on the selection.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following devices and systems may be a component of a larger system, wherein other procedures may take precedence over or otherwise modify their application. Also, a number of steps may be required before, after, or concurrently with the following embodiments.

In various embodiments, a presentation instrument is described which includes an input sensor, a memory unit, and an antenna configured to wirelessly transmit and receive data. The antenna is configured to receive a request for data stored on the memory unit, and may also be configured to induce a voltage from a magnetic field to power the presentation instrument. The input sensor may control whether the presentation instrument can be so powered from the magnetic field. Alternatively, input from the input sensor may otherwise control the functionality of the presentation instrument. By way of example, an input received by the input sensor may be transmitted in addition to the requested data. Additionally, a system is described to process the requested data and additional input data, in accordance with a rules data store.

Figure 1:
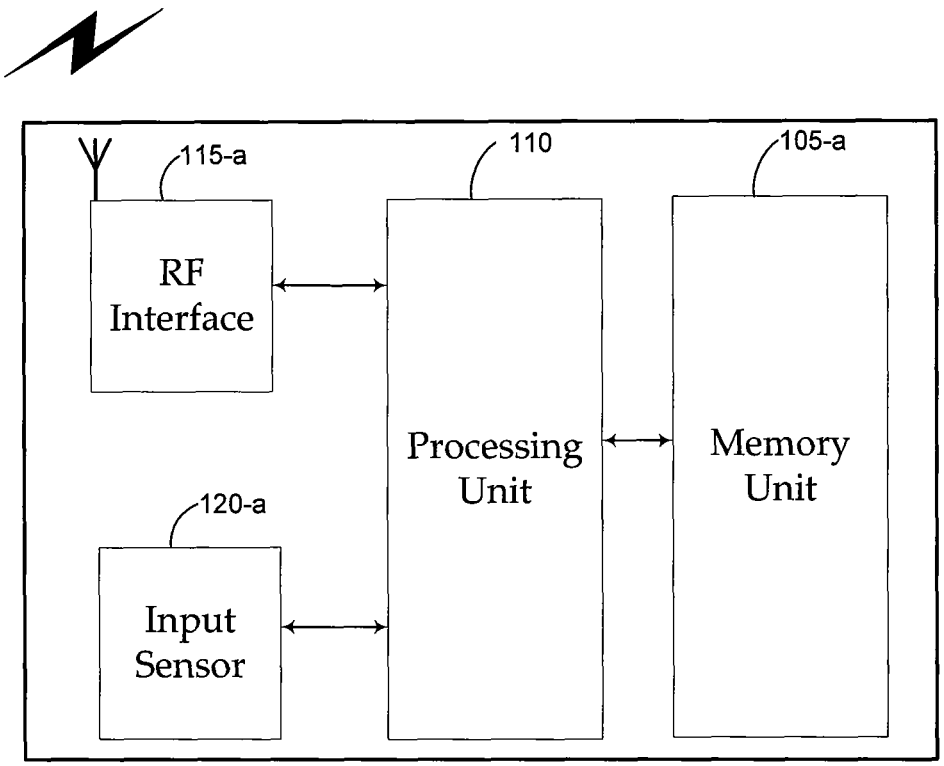
FIG. 1 is a simplified block diagram illustrating a presentation instrument with an input sensor configured according to various embodiments of the present invention.

FIG. 1 is an exemplary embodiment of the invention comprising a presentation instrument 100 with an input sensor 120-*a*. As used herein, the term "presentation instrument" is intended to include any document or device that includes information identifying the first party to a transaction, usually the payor, and that may be used to initiate processing of a transaction. The presentation instrument 100 may, for example, be a credit card, a debit card, a stored value card, a gift card, or other form of smart card. This may include conventional debit cards and credit cards, e.g., ATM cards, bank cards, including those associated with VISA®, Mastercard®, American Express®, etc. While such cards often are made with plastic (e.g., PVC, ABS, PC, PET), other materials may be used as well.

Examples of transactions include credit transactions, debit transactions, ACH transactions, stored-value transactions, and the like. Credit transactions include those transactions in which a financial institution provides funds on behalf of a first party in accordance with a credit agreement. Many individuals may have multiple credit arrangements with different financial institutions or even with the same institution, and more than one of these accounts may be associated with the presentation instrument 100. Debit transactions include those transactions in which funds are transferred from a financial account of the first party automatically in response to the transaction. Many individuals may also have multiple debit arrangements with the same or different financial institutions in various embodiments; one or more these arrangements may also be associated with the presentation instrument 100. ACH transactions include those transactions that make use of the Automated Clearing House, including a variety of electronic-check or other electronic-commerce payments. Stored-value transactions include those transactions in which a prepaid amount is associated with a presentation instrument, execution of the transaction results in a reduction of the prepaid amount in accordance with the amount of the transaction.

Use of the presentation instruments in not limited, however, to use in financial transactions. For example, the presentation instrument may be used as an access card to a secure entrance to a building, facility, or other area. Thus, while the examples below often refer to use during a financial transaction, the presentation instrument and input sensor may be used for access to a secure building, facility, or other area, or other purposes, as well. For example, just as decisions about a financial transaction may be made based on certain inputs/states, so may decisions regarding such access, as evident to those skilled in the art.

The presentation instrument 100 includes a memory unit 105-a for temporary, or more permanent, storage of information. The memory unit 105-a may comprise any computer readable medium, including read only memory (ROM), random access memory (RAM), magnetic RAM, core memory, magnetic disk storage media, optical storage media, flash memory devices or other machine readable media for storing information. The memory unit 105-a may, therefore, be read-only or there may be read and write capabilities. The memory unit 105-a may be a magnetic stripe that is adapted to store information. It could also comprise any RF identification, computer chips, or other magnetic, radio frequency, or electronic storage media that may be readable by existing card reader technology, such as conventional point-of-sale terminals.

There is a variety of information that may be stored in the memory unit 105-a. For example, there may be a card number associated with the presentation instrument 100. In some cases, the presentation instrument 100 will have a card number, and may be tracked through one or more separate account numbers at a host computer system. This scenario permits multiple cards to be tied to the same account, and multiple accounts to be tied to a single presentation instrument 100. However, it will be appreciated that the card number and the account number could be the same number. Alternatively, by way of example, the card number and the account number may be different, and may contain 16 characters so as to have the same format as traditional credit/debit cards. There may be additional information stored on the memory unit 105-a, as well, such as personal information (e.g., address, social security number, phone number), transaction or credit history, recorded use of the input sensor, passwords, authentication and encryption software, access identification information, or any additional information. The data stored on the card may be encrypted.

The presentation instrument 100 also includes a processing unit 110, which may comprise an Application Specific Integrated Circuit (ASIC), or a general purpose processor adapted to perform the applicable functions. Alternatively, the functions of the presentation instrument 100 may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The processing unit may be programmed to access the memory unit 105-a. It may fetch instructions and other data from the memory unit 105-a, or write data to the memory-unit 105-a. The processing unit may be enclosed in a chip module, in any manner known in the art. The processing unit 110 may include one or more processors to perform cryptographic functions, error detection or correction, data transfer, clock functions, memory management, and so on.

The processing unit 110 is coupled with a wireless interface. In this exemplary embodiment, an RF interface 115-a is configured to transmit and receive electromagnetic waves comprising a wireless signal. Data may be transferred from a terminal (e.g., a point-of-sale device, smart card reader, etc.) to the presentation instrument 100, and from the memory unit 105-a to a terminal. Any known modulation techniques may be used (e.g., AM, ASK, PSK, QPSK, etc.). The interface may, in different embodiments, comprise any radio or microwave link, optical link, inductive coupling, or other wireless means known in the art. The RF interface 115-a may comprise the interface for energy transfer as well (e.g., a magnetic field may power a card via inductive coupling). As will be discussed later, the wireless power source may be the only source of power for the presentation instrument, or there may be an additional power source (e.g., a small battery, possibly rechargeable via the wireless interface), as well.

The processing unit 110 is coupled with an input sensor 120-a. The input sensor 120-a may comprise any sensing or input unit, a selection of which will be discussed below. However, it is worth noting that the following description is for exemplary purposes only, and is in no way intended to limit the different possible input sensors that may be employed.

In one embodiment, the input sensor 120-a controls whether the presentation instrument 100 may be powered from the magnetic field. In this exemplary embodiment, assume that the presentation instrument is powered wirelessly via inductive coupling. The input sensor 120-a comprises a dual contact point interface, coupled with the processing unit 110 through an I/O interface. The operation comprises two states, a first state allowing the device to be powered via inductive coupling, and a second state preventing the device from being so powered. The switch could be implemented in a variety of ways. For example, it could be implemented by monitoring the resistance between the contact pads, and interpreting a less than infinite resistance as the ON (i.e., CLOSED) position. The actual interface could be configured to allow the placement of a user's finger across the contacts as the method of bridging the contacts, activating the switch to the ON position. The switch would remain in the OFF (i.e., OPEN) position when the contacts are not closed, thereby preventing the presentation instrument from being powered.

Figure 2A:
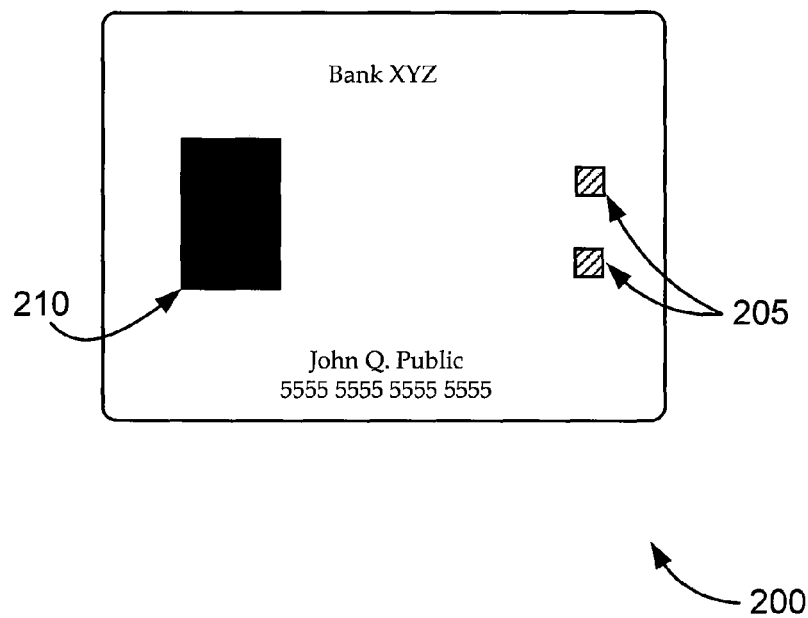
FIG. 2A front view of a presentation instrument according to one embodiment of the invention.
Figure 2B:
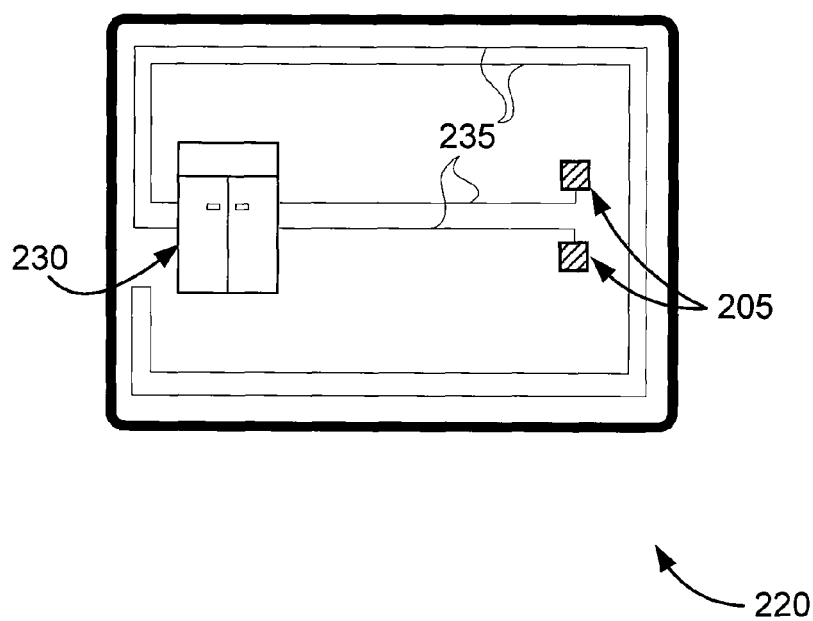
FIG. 2B is a block diagram of the components of the presentation instrument illustrated in FIG. 2A.

Turning to FIG. 2A, an example of a front view of such a presentation instrument 200 is illustrated. The two contact points 205 are located on a presentation instrument 200 that is approximately standard credit card size (2⅛"×3⅜"), although different forms of packaging and sizes may be employed in other embodiments. The processing unit and memory unit are included in the chip module 210. In FIG. 2B, a block diagram 220 illustrating a selection of electronic components found on the presentation instrument of FIG. 2A are illustrated. The contact pads 205 are each connected with the processing unit 230 via conductors 235. The OPEN state may be configured to limit or control the wireless reception of power via the RF interface. Alternatively, the OPEN state could otherwise prevent the processing unit or memory unit from being powered. Thus, there are a variety of configurations which could prevent or otherwise limit the functionality and operation of the presentation instrument until the contacts 205 are in a CLOSED state. Moreover, in some embodiments, when the contacts are CLOSED, the presentation instrument may be configured to remain functional for an additional period of time (e.g., 5 or 10 seconds) once the contacts are reopened.

In another embodiment, the contacts 205 of the presentation instrument 200 are again configured to operate in the two states, OPEN or CLOSED. However, instead of limiting the power or functionality of the presentation instrument 220, they are configured to communicate their state to the processing unit 230. The processing unit 230, in this embodiment, is configured to include this state information with the requested data (e.g., account information). For example, assume a transaction in which a 16 digit account number stored on the presentation instrument 200 is requested. Instead of transmitting only the account number, state information is transferred as well. This state information could simply be an additional binary output at the end of the account number. Alternatively, the state information could be included in any manner known in the art.

Embodiments of the invention are not, however, limited to the two contact pad implementations discussed above. Turning back to FIG. 1, for example, an input sensor 120-*a* may comprise a two state capacitance switch (e.g., a touch switch) implemented to use the capacitance of the human body as a switching method. When the presentation instrument 100 is powered (e.g., via inductive coupling) the capacitance switch is queried, and based upon the capacitance level the processing unit 120 could infer the activation or deactivation (ON/OFF) state of the switch.

In another embodiment, an input sensor comprises a pressure switch, which effectively operates in the same manner as the two state switching devices described above. The difference is in the physical switching device. The pressure switch may be covered with a flexible membrane that would protect the actual switching component, with all other operations similar to the two state devices described above.

In still other embodiments, the input sensor may comprise a more traditional "slide type" switch, that would allow the user to physically switch the operational state of the presentation instrument. This implementation differs from the above implementations in that it allows a user to make a setting that controls the chip function, until the switch is changed. The slide switch could be implemented as a two-state switch, as described above. Alternatively, there could be three positions for the slide switch with, for example, one setting for "off," one setting for "on," and a third setting to indicate approval of a purchase. Other settings are possible, as well, as evident to those skilled in the art.

Figure 2C:
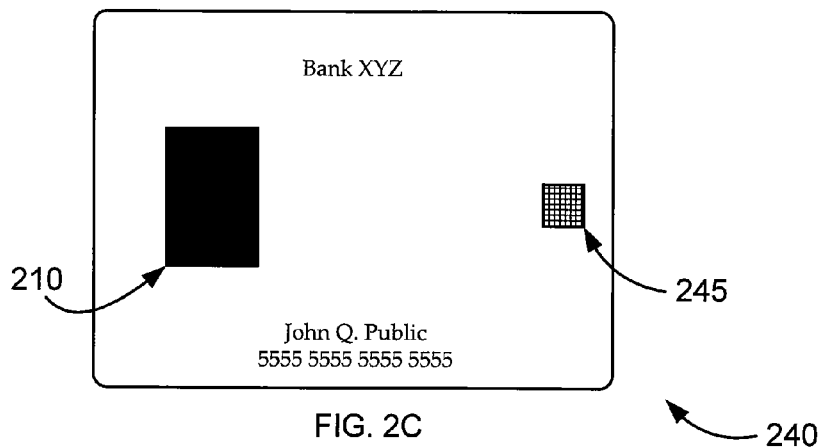
FIGS. 2C-2E comprise the front views of different presentation instruments configured according to various embodiments of the invention.

In the embodiments above a user typically provides the input, but that need not be the case. Turning to FIG. 2C for example, a presentation instrument 240 is illustrated where the input sensor comprises a light sensor 245. The light sensor may comprise any light sensing device known in the art, from, for example, the most basic light sensing device to an image sensor array. The light sensor could also function as mechanism to power the presentation instrument (e.g., a solar/light powered unit). The light sensor 245 could be implemented as a two-state sensor, wherein placement of the presentation instrument 240 in a dark space (e.g., a wallet) deactivates the presentation instrument 240. In this embodiment, the light sensor 245 is connected to the processing unit in the chip module 210, again via an I/O interface. The light sensor 245 could thus be configured to deactivate the functions of the RF interface or processing unit when the light level drops below a set level. Alternatively, in another embodiment, the processing unit 210 reads or otherwise receives two-state information regarding the light level, and this information is included when, for example, an account number is transmitted for the presentation instrument. In yet another embodiment, the processing unit 210 reads or otherwise receives information regarding the light level within a multitude of ranges, and transmits the reading or range. Thus, the input from the light sensor 245 can also operate by providing a quantitative value to the I/O interface to provide a real time indication of the level of illumination. Thus, while in some embodiments the input sensor is a two-state device, in other embodiments the input sensor may comprise three or more states.

Figure 2D:
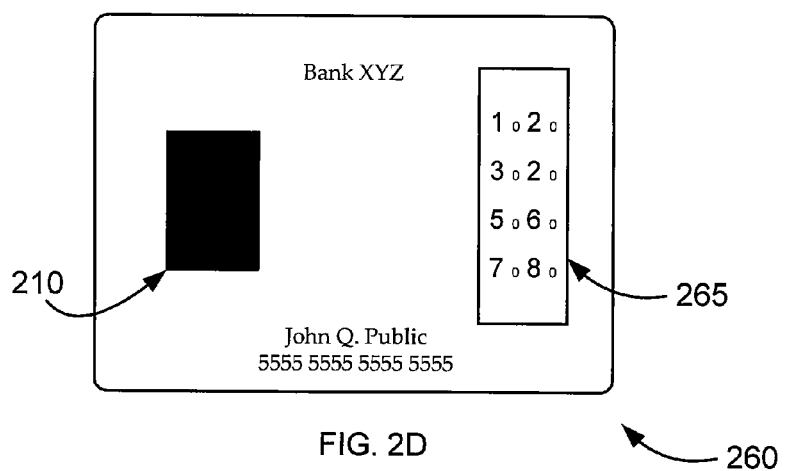

Turning to FIG. 2D, an exemplary presentation instrument 260 is illustrated where the input sensor is connected to the processing unit, and comprises a plurality of numbered input sensors 265. In this embodiment, there are 8 individual sensors, but in other embodiments other numbers and configurations may be used. Each input sensor may be individually activated by the user of the device, and a variety of such input sensors are well known in the art so further technical elaboration is not necessary. The plurality of input sensors 265 may be used in a variety of ways to provide additional control over the presentation instrument. For example, a series of numbers may be selected in succession to allow input of a password. Alternatively, two or more numbers may be input simultaneously to comprise a password input. The password input authorization information, in this embodiment, is stored on the memory unit of the presentation instrument 260. With the input of the correct password, the presentation instrument may be rendered functional. Thus, the password input could provide the two state ON/OFF control for the presentation instrument 265, preventing or allowing the device to transmit data such as account information.

In another embodiment, the input sensors can first function much like the contact pads. Thus, by placing a finger over two or more sensors, the configuration of the presentation instrument 260 is modified to allow the device to be powered wirelessly via a magnetic field, or otherwise to become functional for a period of time (e.g., 5 or 10 seconds). Once the presentation instrument is functional, the numbered input sensors may be used to provide password or other validating input to authorize a transaction, or to access a secure region of the memory unit.

Figure 2E:
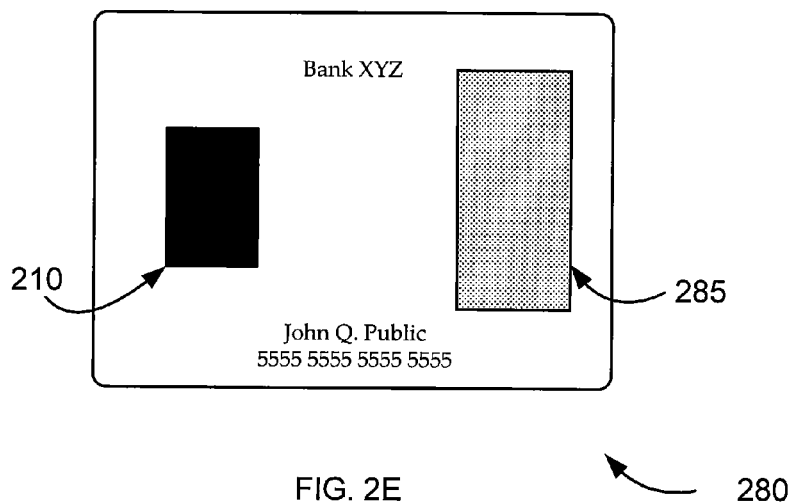

Finally, FIG. 2E illustrates an exterior view of a presentation instrument 280 including an input sensor comprising a biometric measurement unit 285. In this embodiment, there is an array of sensors configured to, in effect, measure the outline of a finger placed on the measurement unit 285. In other embodiments, other types of biometric input may be used. Each input sensor of the array may be activated by, for example, pressure or light. A variety of such input sensors are well known in the art, and further elaboration is not necessary. The measurement unit 285 may be used in a variety of ways to provide additional control over the presentation instrument. For example, assume a measurement of the outline is taken of a finger placed on the device. The authorization information, in this embodiment, is stored on the memory unit of the presentation instrument 200. When there is a match, the presentation instrument may be rendered functional. Thus, the proper biometric input could provide the two-state ON/OFF control for the presentation instrument 265, preventing or allowing the device to transmit data such as account information.

Alternatively, the measurement unit can first function much like the contact pads. Thus, by placing a finger on the measurement unit 285, the configuration of the presentation instrument 280 is modified to allow the device to be powered wirelessly via a magnetic field, or otherwise to become functional for a period of time (e.g., 5 or 10 seconds). Once the presentation instrument 280 is functional, a biometric input (e.g., an outline of a finger) could be used to provide password or other validating input to authorize a transaction, or allow access to a secure region of the memory unit. The foregoing discussion of the various options for input sensors is exemplary, and should not be interpreted as limiting the various options.

Figure 3:
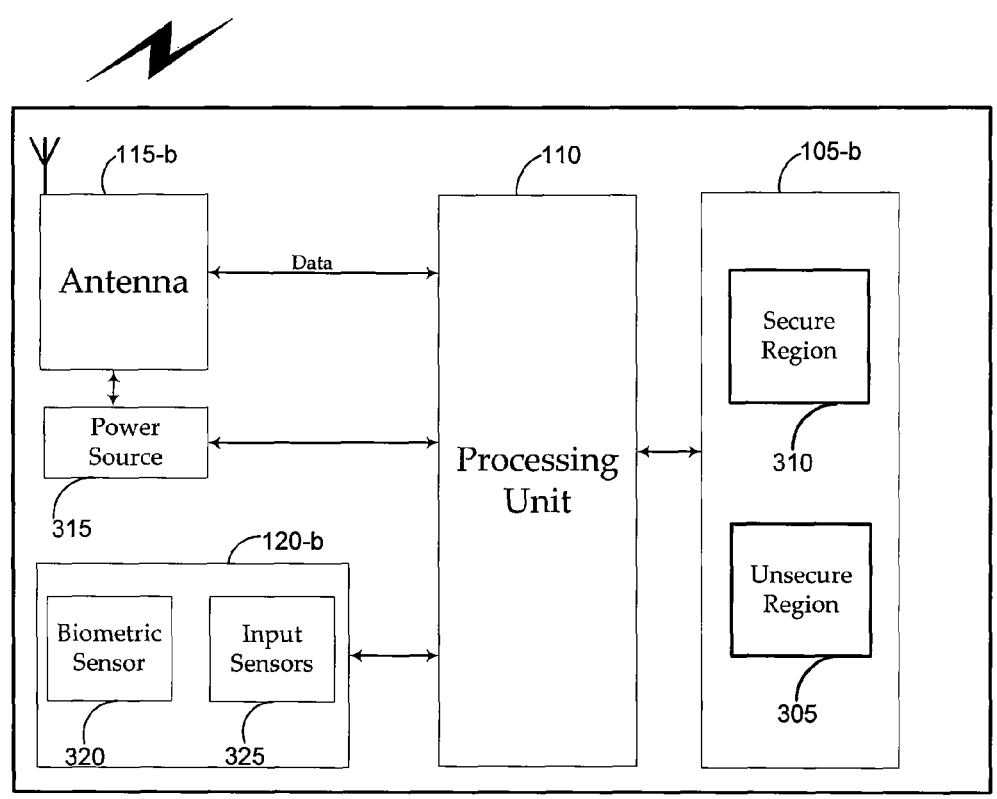
FIG. 3 is a simplified block diagram illustrating an alternative configuration of a presentation instrument with an input sensor configured according to various embodiments of the present invention.

FIG. 3 is an alternative exemplary embodiment of the invention comprising a presentation instrument 300 with a plurality of input sensors 120-*b*. The presentation instrument 300 includes a processing unit 110 coupled with the memory unit 105-*b*. In this exemplary embodiment, the memory unit includes an unsecure region 305. This unsecure region is configured to store information which is accessible to be transmitted upon request, (so long as the card is functional). Thus, this information may be unencrypted. The memory unit also includes a secure region 310. For the secure region 310 in this embodiment, some additional input is required from the user of the card to allow access to this region (e.g., a password or biometric measurement). The remainder of the data stored on the memory unit 105-*b* is accessible, but only if requested from a source determined to be authorized to access the data (e.g., a point-of-sale device authorizing a requested transaction). The data may be encrypted or otherwise protected, but once the card is activated, the data is accessible to the authorized source (i.e., no additional user input is required). There are a variety of ways known in the art to determine whether a request from a terminal is from a trusted, or otherwise authorized, source.

The presentation instrument 300 includes an antenna 115-*b* configured to transmit and receive wireless signals, and further configured to wirelessly draw power from a source. In one embodiment, the antenna may comprise a coil, which draws power from a magnetic field via inductive coupling. In other embodiments, the antenna may be configured to draw power using other methods known in the art. The presentation instrument 300, in this embodiment, includes a separate power source 315 (e.g., a small battery). The power source 315 may be configured to power all, or only a limited number, of functions of the device. The power source 315 may comprise a rechargeable battery that is charged with power drawn from the antenna (or, alternatively, perhaps is solar/light powered). Thus, while the input sensor 120-*b* may control whether the presentation instrument 300 (or components thereof) may be wirelessly powered, the input sensor 120-*b* may simply be configured to prevent a battery powered presentation instrument (or components thereof) from functioning.

Turning to the input sensor 120-*b*, in this embodiment there is a biometric sensor 320 and additional input sensors 325. Thus, this embodiment illustrates how different configurations of sensors may be used in combination to provide control over the functionality of the presentation instrument 300. By way of example, the input sensors 325 may be configured to control whether the presentation instrument 300 is operational (e.g., on/off functionality), while the biometric sensor 320 may be configured to control access to data in the secure region 310.

Figure 4A:
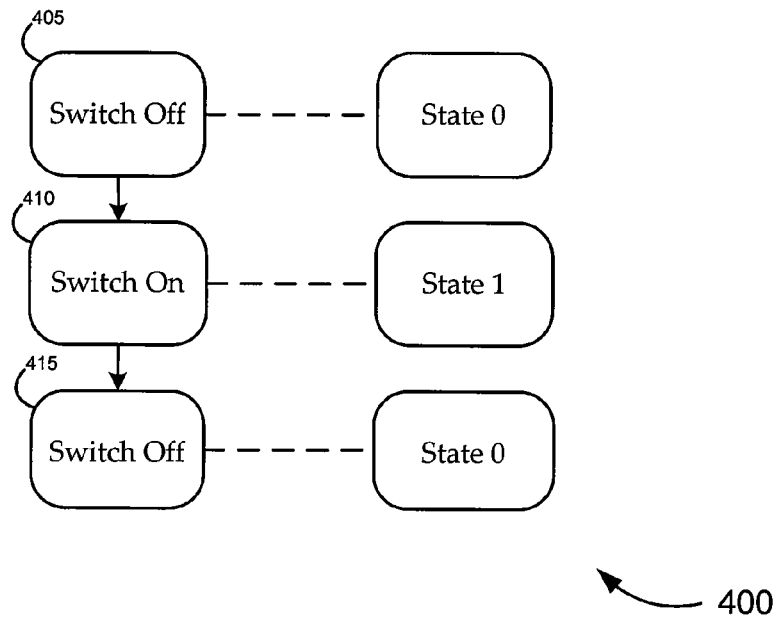
FIGS. 4A-4C illustrate various state diagrams applicable to the input sensors embedded in a presentation instrument configured according to various embodiments of the present invention.
Figure 4B:
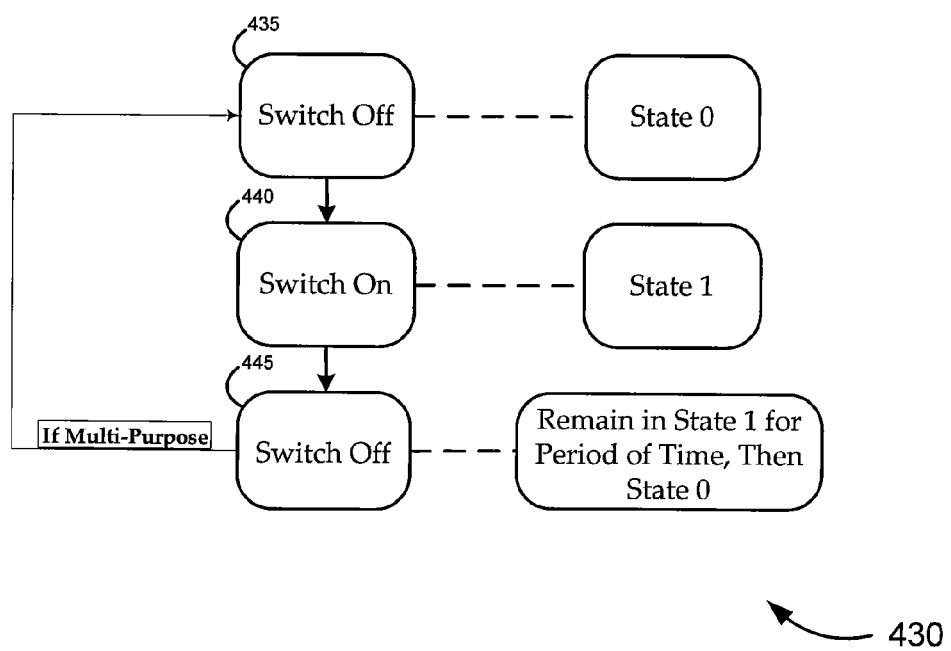
Figure 4C:
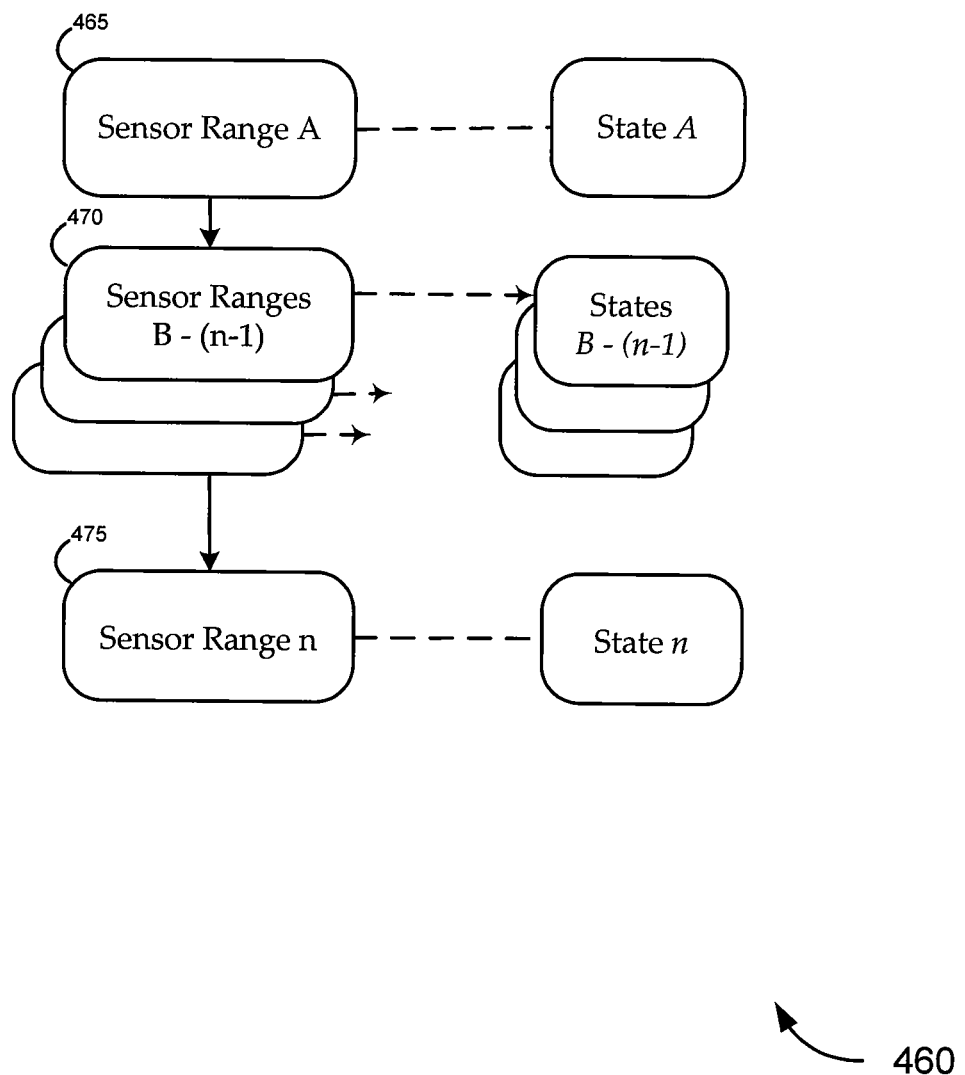

FIGS. 4A-4C depict selected options for the varying states of the input sensor. This discussion is not intended to limit the various state options, but instead to illustrate the various input sensor states in different embodiments of the invention. First, consider the state diagram 400 of FIG. 4A. In this example, assume a two-state input sensor, the input sensor effectively comprising a switch. When the switch is off, at block 405, the input sensor is in a first state, State 0. When the switch is turned on (e.g., via contact, pressure, light, capacitance) at block 410, the input sensor goes to a second state, State 1. In this example, as soon as the switch is turned off at block 415 (e.g., the contact, pressure, light, capacitance drops below a set level), the input sensor returns to the first state, State 0. This type of switch may be used to control the functionality of the presentation instrument. Thus, the switch may be configured to prevent the operation of the presentation instrument in State 0, while enabling operation in State 1. Alternatively, the State (0 or 1) could be transmitted with the requested account information.

Next, consider the state diagram 430 of FIG. 4B. In this example, again assume a two-state input sensor, the input sensor effectively comprising a switch. When the switch is off, at block 435, the input sensor is in a first state, State 0. When the switch is turned on (e.g., via contact, pressure, light, capacitance) at block 440, the input sensor goes to a second state, State 1. In this example, when the switch is turned off at block 445 (e.g., the contact, pressure, light, capacitance drops below a set level), the input sensor returns to the first state, State 0, after a set period of time (e.g., 5, 10, or 60 seconds). This type of switch may be used to control the functionality of the presentation instrument. For example, the switch may be configured to prevent the operation of the presentation instrument in State 0, while enabling operation in State 1. Also, the state (0 or 1) could be transmitted with the requested account information.

Furthermore, the switch could be a Multi-Purpose two-state switch. For example, assume the presentation instrument is not functional, as the switch is off, at block 435. When the switch is turned on (e.g., via contact, pressure, light, capacitance) at block 440, the input sensor goes to a second state, State 1. In this example, when the switch is turned off at block 445 (e.g., the contact, pressure, light, capacitance drops below a set level), the presentation instrument remains functional for a period of time. If the switch is turned on again (e.g., via contact, pressure, light, capacitance) during that operational time period, the switch functions to provide state information for transmission with the requested account information. Thus, a single two-state switch could thereby be configured to 1) provide protection against snooping, and 2) confirm that the presentation instrument is possessed by a purchaser.

Finally, consider the state diagram 460 of FIG. 4C. In this example, assume a multi-state input sensor, wherein different combinations of input result in different states. For example, there could be various numbered or other configurations of sensors. Different combinations of input, received either concurrently or successively, result in different input sensor states. Sometimes, a range of inputs will all result in a particular sensor state. For purposes of discussion, therefore, the term "range" will be used, but it is worth noting that a range may simply comprise a given combination of inputs. Turning to the exemplary embodiment illustrated in FIG. 4C, any sensor input in Range A, at block 465, results in State A. Similarly, at blocks 470 and 475, each distinct range of inputs, Range B—Range n, results in a different State. This type of switch may be used to control the functionality of the presentation instrument. For example, the input sensor may be configured to prevent the operation of the presentation instrument in State A (e.g., no input), while enabling operation in all other states. Alternatively, additional protection may be provided by rendering the card functional only if certain passwords, biometric measurements, or other combinations of inputs (i.e., Sensor Ranges) match data stored in the memory unit. Moreover, there could be different levels of security (i.e., any input renders presentation instrument functional, while only certain ranges of input allow access to a secure region of the memory unit).

Figure 5:
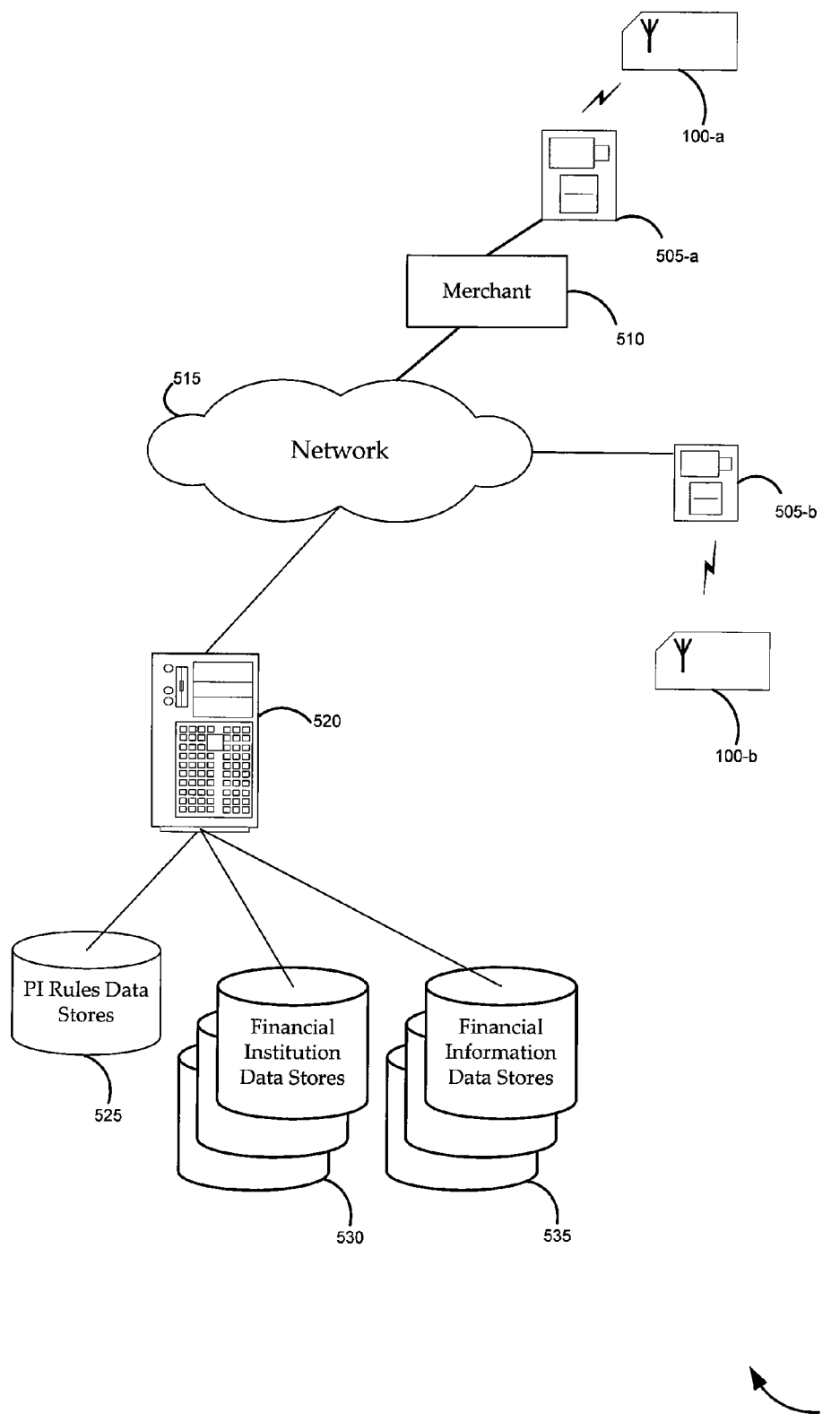
FIG. 5 illustrates a diagram of a system for processing information and input from a presentation instrument configured according to various embodiments of the present invention.

FIG. 5 illustrates an exemplary system 500 within which various embodiments of the invention may operate. The components of such a system may be directly connected, or may be connected via a Network 515, which may be any combination of the following: the Internet, an IP network, an intranet, a wide-area network ("WAN"), a local-area network ("LAN"), a virtual private network, the Public Switched Telephone Network ("PSTN"), or any other type of network supporting data communication between devices described herein, in different embodiments. A Network 515 may include both wired and wireless connections, including optical links. Many other examples are possible and apparent to those skilled in the art in light of this disclosure. In the discussion herein, a Network 515 may or may not be noted specifically. If no specific means of connection is noted, it may be assumed that the link, communication or other connection between devices may be via a Network 515.

According to various embodiments of the invention, the system 500 includes a host computer system 520. The host computer system 520 may include, for example, one or more server computers, personal computers, workstations, web servers, or other suitable computing devices. The host computer system 520 may be fully located within a single facility or distributed geographically, in which case a Network 515, as described above, may be used to integrate different components.

The host computer system 520 may be in communication with one or more databases or other data stores, such as a PI Rules Data Store 525, Financial Institution Data Stores 530, and Financial Information Data Stores 535. According to different embodiments of the invention, each data store may include any number of tables and sets of tables. In addition, these data stores may comprise a single database. Application software running on the host computer system 520 may query the applicable data stores, and produce decisions as dictated by the application software. Each may be incorporated, in whole or in part, within the host computer system 520 (e.g., within its storage media), or may be a part of a separate system associated with the host computer system 520. Each may be fully located within a single facility, or distributed geographically. Each data store may be organized in any manner different than described above to provide the functionality called for by the various embodiments, as known by those skilled in the art.

The host computer system 520 is in communication, directly of indirectly, with the terminals 505 that communicate directly with the presentations instruments 100 configured according to various embodiments of the invention. A terminal 505 may be operated by a merchant 510, or may be independent of a merchant. A terminal 505 may comprise a point-of-sale device, a scanner, a smart card reader, or any other interface that provides the data connectivity with a presentation instrument 100. Often, the terminal 505 also provides the magnetic field or other source to wirelessly power the presentation instrument 100.

By way of example, a terminal 505 requests transaction data (e.g., account information) from a presentation instrument 100 for purposes of authorizing and completing a transaction. The presentation instrument 100 transmits the data related to the transaction, which may include any selection from the group consisting of a location, merchant, time, amount, or stock keeping unit (SKU) number. Also, the presentation instrument 100 may include additional data regarding the state of the input sensor (whether it be a two-state sensor, or a sensor that has additional states). This set of data is received by the host computer system 520.

The host computer system 520 receives the set of data related to the transaction, and accesses the PI Rules Data Store 525 to determine the handling of the transaction. The PI Rules Data Store 525 includes rules for processing the data received to identify one or more of a number of different outputs. Some of the rules relate to the approval or denial of a transaction based at least in part on the data representative of the state of the input sensor. Other rules may relate to factoring a credit account balance, available credit, credit history, etc. of the holder of the presentation instrument 100, or other responsible party. Therefore, the host computer system 520 may also query the Financial Institution Data Stores 530 (e.g., to get balance or other account information) and Financial Information Data Stores 535 (e.g., to get credit ratings or history), and apply this information to the rules as well. The host computer system 520 processes the received set of data by applying the set of data to the rules.

The host computer system 520 is then configured to transmit a responsive output. If transaction data and the data defining the state of the input sensor are both received, the host computer system 520 may authorize or deny the transaction based on the application of the rules. The outcome, in some instances, is based at least in part on the data representative of the state of the input sensor. If only the transaction data is received (with no data defining the state of the input sensor), the rules may include one or more outputs directing reuse of the presentation instrument with a valid user input (i.e., with proper state information).

Figure 6:
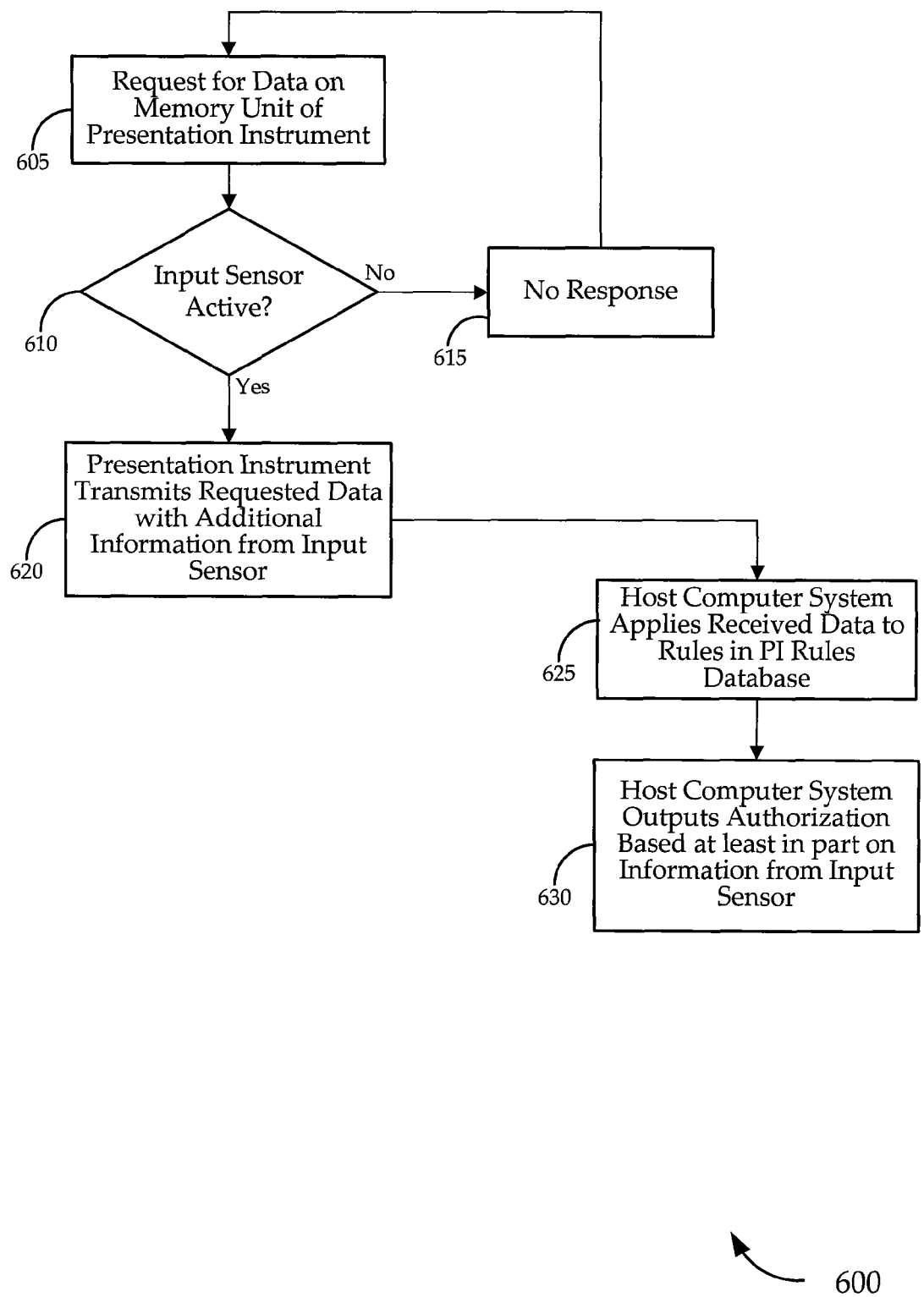
FIG. 6 illustrates a method for processing information and input from a presentation instrument configured according to various embodiments of the present invention.

FIG. 6 sets forth an exemplary embodiment 600 of the invention, illustrating a method of processing a transaction with a presentation instrument. At block 605, a request for data stored on the memory unit of the presentation instrument is transmitted. At block 610, the input sensor will be in one of two state states: active (i.e., above a threshold level of contact, pressure, light, capacitance, etc.), or not active (below a threshold level of contact, pressure, light, capacitance, etc.). At block 615, if the input sensor is not active, there will be no response because the non-active state renders the presentation not functional or operational. However, if, as at block 620, the input sensor is active, the presentation instrument transmits the requested data (e.g., account information), and in addition transmits the additional state information from the input sensor, identifying the input sensor as active. At block 625, the host computer system applies received data (i.e. both the requested data and the additional state information) to rules in the PI Rules Database. At block 630, the host computer system outputs an authorization based at least in part on information from the input sensor.

Figure 7:
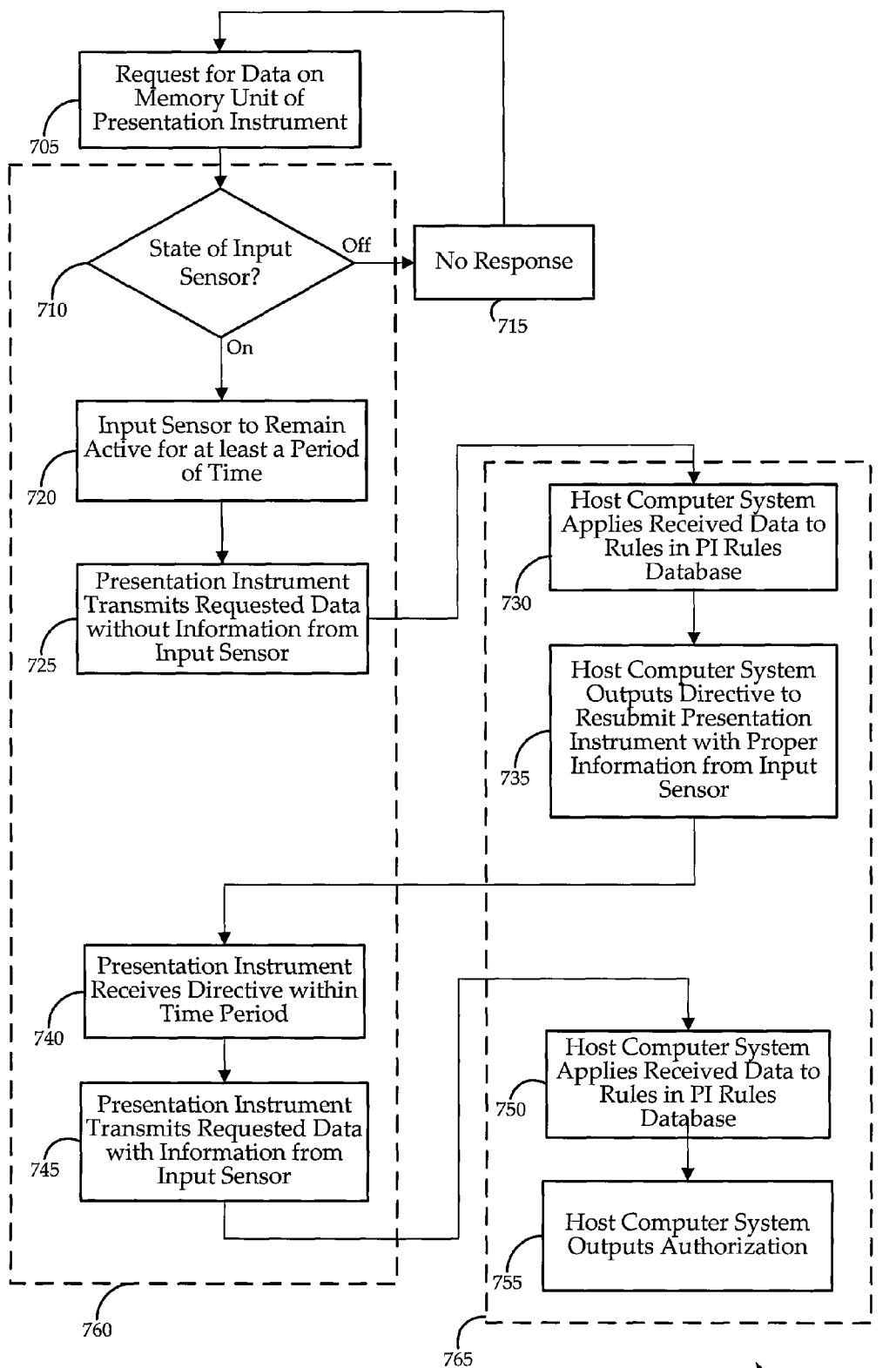
FIG. 7 illustrates an alternative method for processing information and input from a presentation instrument configured according to various embodiments of the present invention.

FIG. 7 sets forth another exemplary embodiment 700 of the invention, illustrating an alternative method of processing a transaction with a presentation instrument. At block 705, a request for data stored on the memory unit of the presentation instrument is transmitted. At block 710, the input sensor will be in one of two states, which will be referred to in this example as "on" or "off." At block 715, if the input sensor is in the off state, there will be no response because in the non-active state renders the presentation instrument not functional or operational. However, as illustrated at block 720, the input sensor may alternatively be in the "on" state, and if so will remain there for a specified period of time (e.g., because when the input sensor crosses above or below a threshold level of contact, pressure, light, or capacitance, the sensor remains in the "on" state for at least a period of time). If "on," the presentation instrument at block 725 transmits the requested data (e.g., account information, location, amount, merchant, etc.), but does not transmit additional state information from the input sensor.

At block 730, a host computer system applies the received data to rules in PI Rules Database. At block 735, the host computer system outputs a directive to resubmit the presentation instrument with proper information from the input sensor, as called for by the rules. At block 740, the presentation instrument (perhaps via a terminal) receives the directive within its operational time period (i.e., before it has returned to the off state). At block 745, the presentation instrument transmits the requested data with the state information from the input sensor. At block 750, host computer system applies received data (including the input from the input sensor) to rules in PI Rules Database. At block 755, the host computer system outputs an authorization based at least in part on the input sensor information. This flow chart provides an example of the interrelation between the presentation instrument functionality (illustrated by the dashed line identified by reference numeral 760) and the host computer system functionality (illustrated by the dashed line identified by reference numeral 765).

Figure 8:
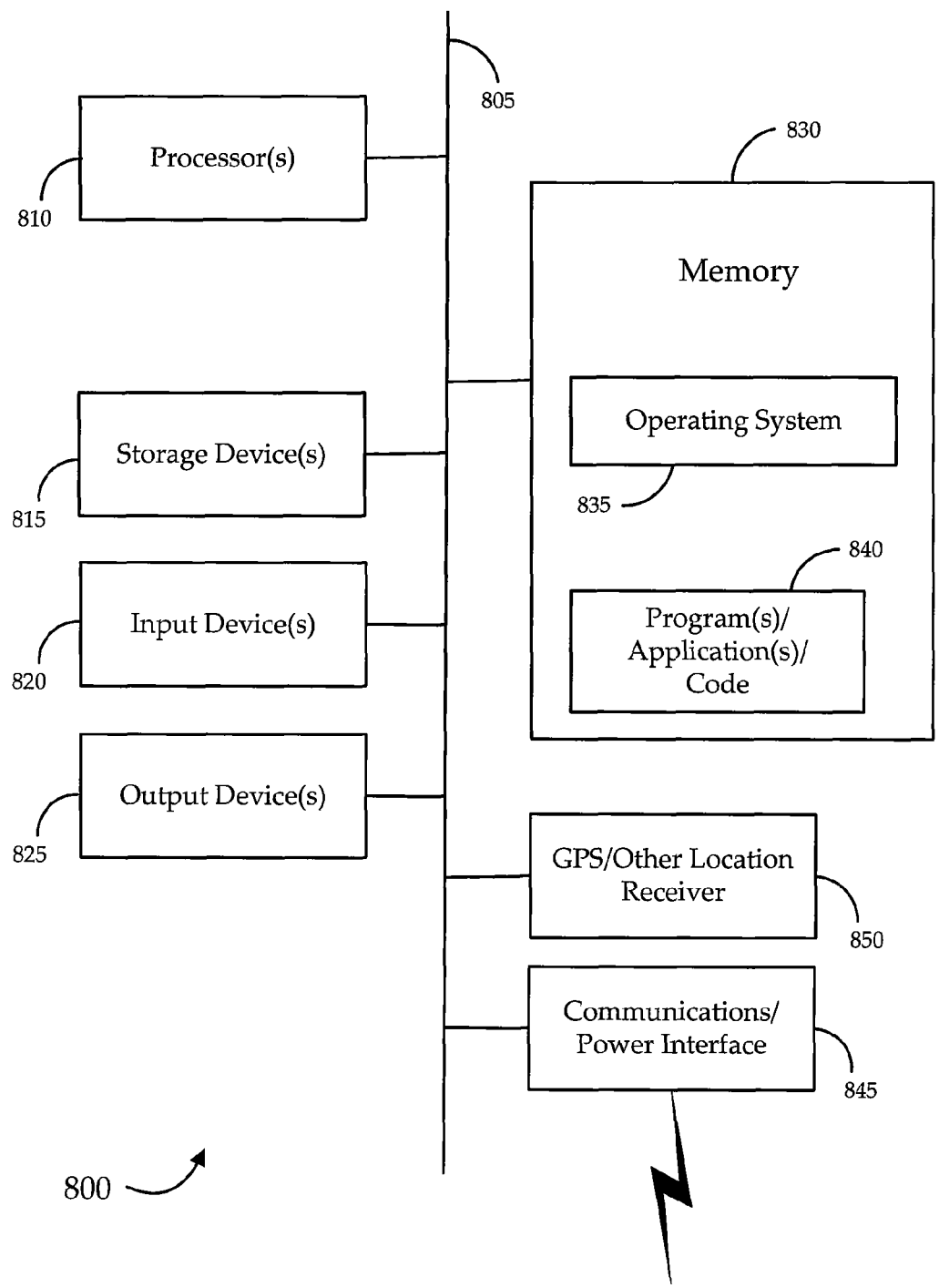
FIG. 8 is a schematic diagram that illustrates a representative device structure that may be used in various embodiments of the present invention.

A device structure 800 that may be used for a host computer, server, point-of-sale device, terminal, reader, or other computing device described herein is illustrated with the schematic diagram of FIG. 8. This drawing broadly illustrates how individual system elements of each of the aforementioned devices may be implemented, whether in a separated or more integrated manner. The exemplary structure is shown comprised of hardware elements that are electrically coupled via bus 805, including processor(s) 810 (which may further comprise a DSP or special-purpose processor), storage device(s) 815, input device(s) 820, and output device(s) 825. The storage device(s) 815 may comprise a computer-readable storage media reader connected to any computer-readable storage medium, the combination comprehensively representing remote, local, fixed, or removable storage devices or storage media for temporarily or more permanently containing computer-readable information. The communication/power interface(s) 845 may comprise a wired, wireless, or other type of interfacing connection and/or antenna that permits data and/or power to be exchanged with other devices. The communication/power interface 845 may permit data to be exchanged with a network (including, without limitation, the Network 115).

The structure 800 may also comprise additional software elements, shown as being currently located within working memory 830, including an operating system 835 and other code 840, such as programs or applications designed to implement methods of the invention. The structure may include a GPS or other Location Receiver 850, to receive and provide location based data. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flowchart, a data flow diagram, or a block diagram. Although a these diagrams may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "memory unit" and "means for storing data" may represent one or more devices for storing data, including read only memory (ROM), random access memory (RAM), magnetic RAM, core memory, magnetic disk storage mediums, optical storage mediums, flash memory devices or other machine readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium, such as a memory unit. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A card including an input sensor, the card comprising:
a memory unit;
wherein the input sensor receives an input from a user verifying authorized usage of the card, wherein the input sensor comprises two contact pads on the card that are bridged by a finger of a user across the contact pads;
an antenna, wherein the antenna:
wirelessly receives a first set of electromagnetic waves comprising a signal including a request for data stored on the memory unit; and
transmits a wireless signal comprising a second set of electromagnetic waves including data responsive to the request;
draws wireless power for the card from a magnetic field via inductive coupling; and
a processing unit coupled with the memory unit, the input sensor, and the antenna, for controlling access to the memory unit based on whether the input from a user is received at the input sensor, wherein the processing unit:
prevents access to the memory unit by not wirelessly powering the memory unit when the input is not received at the input sensor; and provides access to the memory unit to retrieve the requested data when the input is received at the input sensor.

2. The card of claim 1, wherein, the memory unit further comprises a secure storage region; and the processing unit controls access to the secure storage region based on the input received at the input sensor.

3. The card of claim 2, wherein, the processing unit prevents access to the secure storage region unless the input is received at the input sensor substantially concurrent with the antenna receiving the first set of electromagnetic waves.

4. The card of claim 1, wherein the input sensor is limited to a first state and a second state.

5. The card of claim 4, wherein the input not being received at the input sensor causes the input sensor to be in the first state.

6. The card of claim 1, wherein,
the input sensor further comprises a plurality of input sensors; and different combinations of input among the plurality of sensors result in different resulting states for the input sensor.

7. The card of claim 6, wherein the input sensor further receives:
a biometric reading; and a password input.

8. The card of claim 7, wherein the password input comprises an input received at a subset of the plurality of input sensors.

9. The card of claim 1, wherein,
the antenna draws power from an external source to induce a voltage for the presentation instrument,
wherein the card is prevented from being powered from the external source without the input being received at the input sensor.

10. The card of claim 1, wherein the presentation instrument comprises a credit card, a debit card, an ATM card, a stored value card, or a gift card.

11. A card including an input means, the card comprising:
means for wirelessly receiving a first set of electromagnetic waves comprising a signal including a request for data stored within the card;
means for receiving an input from a user verifying authorized usage of the card, wherein the means for receiving an input comprises two contact pads on the card that are bridged by a finger of a user across the contact pads;
means for drawing wireless power for the card from a magnetic field via inductive coupling;
means for storing data;
processing means coupled with the means for storing data and configured to control access to the means for storing data, based on the input from a user verifying authorized usage, including means for preventing access to the stored data by not wirelessly powering the memory unit when the input from a user verifying authorized usage is not received at the means for receiving, and means for providing access to the stored data to retrieve the requested data when the input from a user verifying authorized usage is received at the means for receiving; and
means for wirelessly transmitting a second set of electromagnetic waves comprising a signal including:
a subset of the data from the storing means; and data representative of the input.

12. The card of claim 11, wherein:
the processing means controls access to a secure storage region based on an input received at the input means, wherein,
the means for storing data further comprises the secure storage region.

13. The card of claim 11, further comprising:
means for wirelessly drawing power from an external source to induce a voltage for the card,
wherein the card is prevented from being powered from the external source unless the input is received at the input means substantially concurrent with the input being received.

* * * * *